Sept. 22, 1964     L. SZABO ETAL     3,149,430
DEVICE FOR THE PRODUCTION OF VISUAL DISPLAYS
Filed April 11, 1960     3 Sheets-Sheet 1
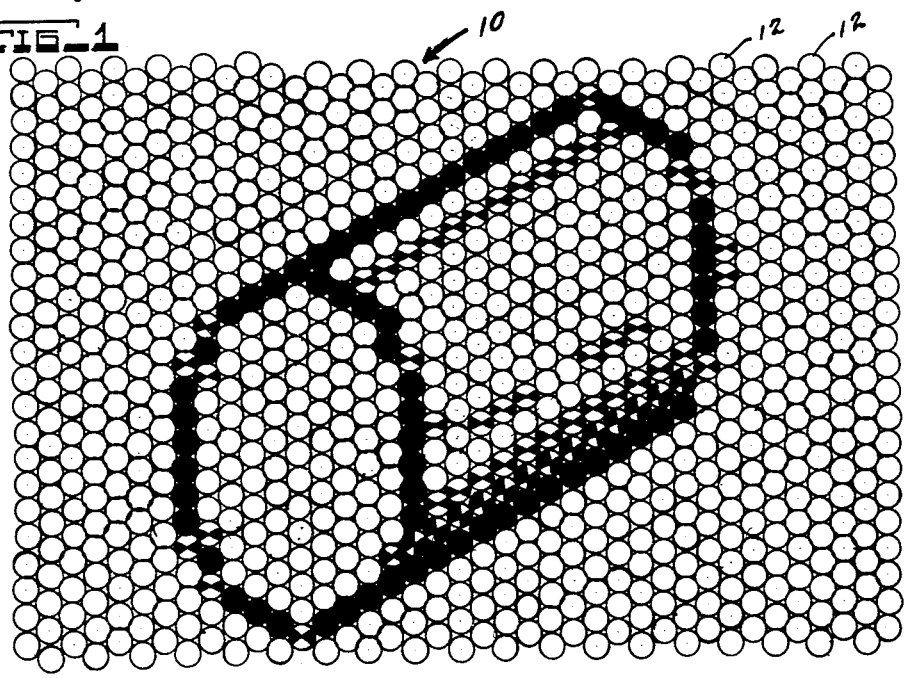
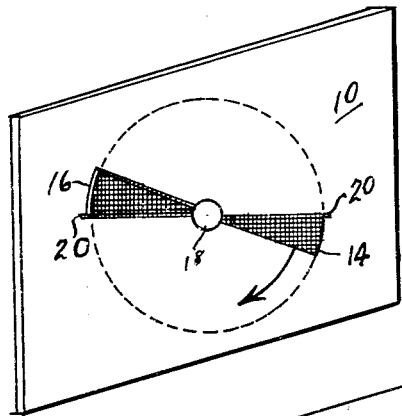
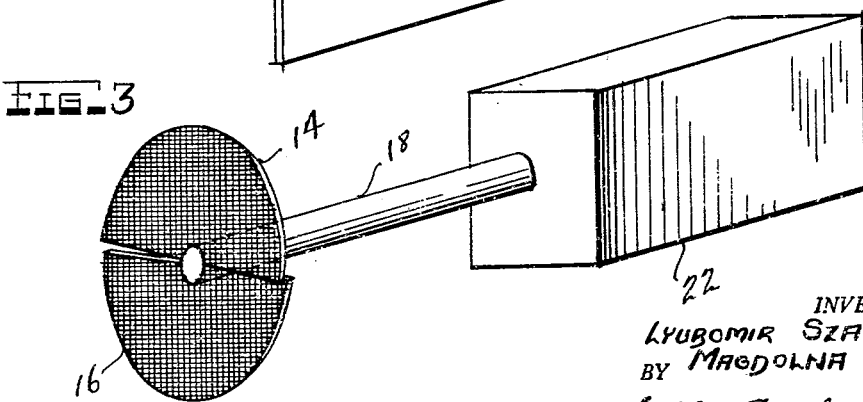
INVENTORS
LYUBOMIR SZABO &
BY MAGDOLNA SZABO,
Schley, Trask + Jenkins
ATTORNEYS.

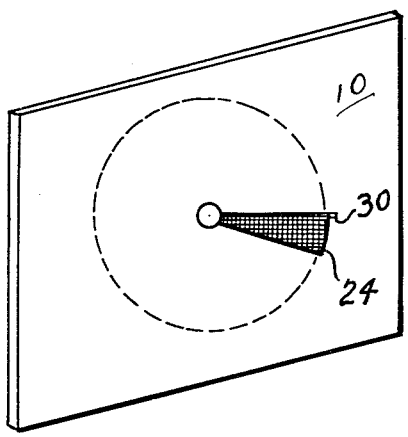
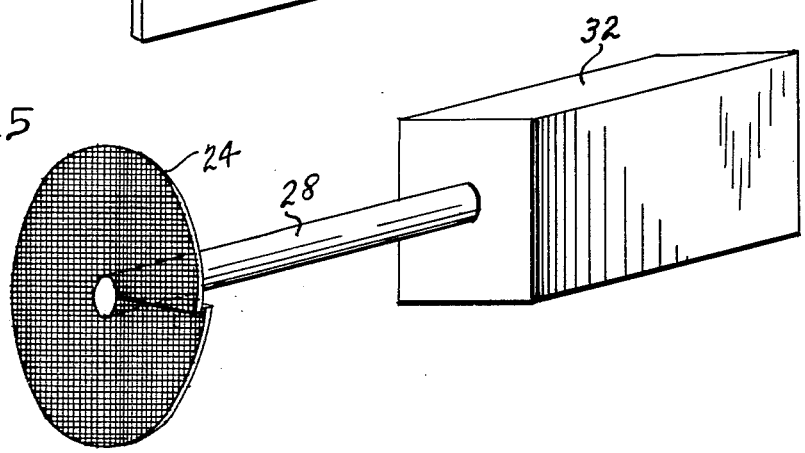
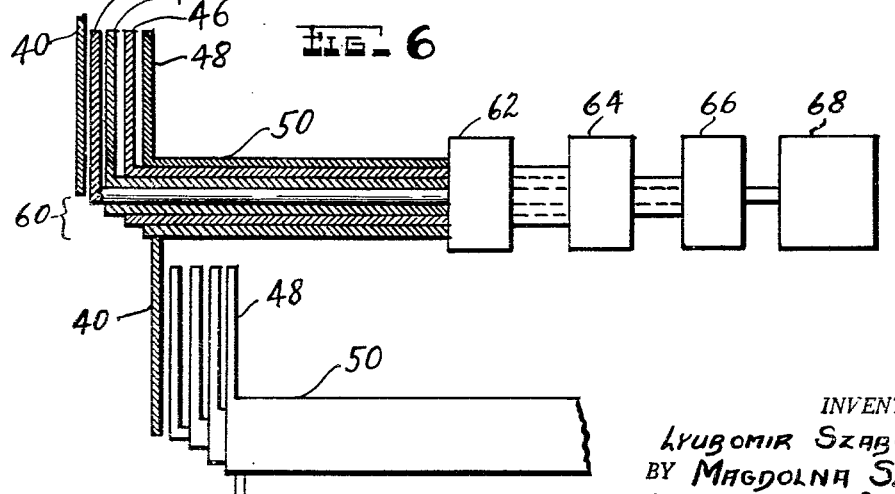

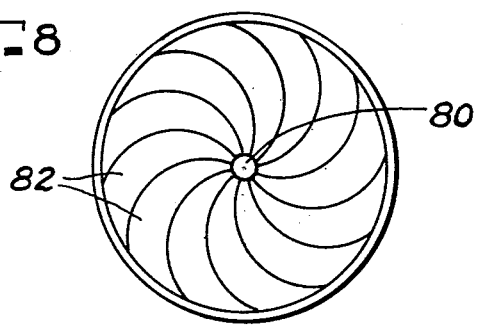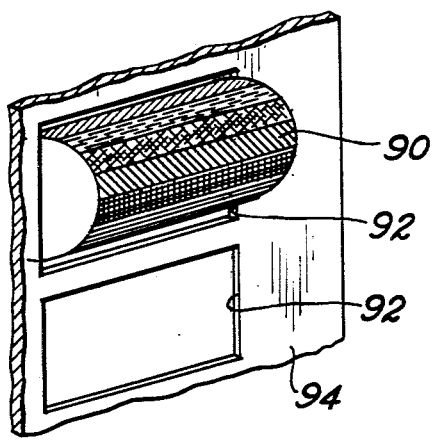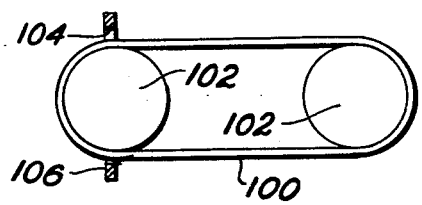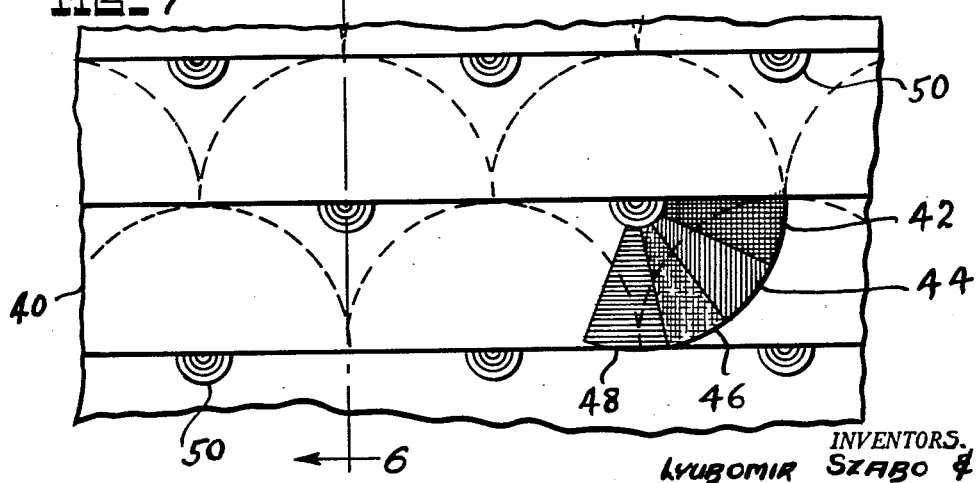

3,149,430
DEVICE FOR THE PRODUCTION OF VISUAL DISPLAYS
Lyubomir Szabo and Magdolna Szabo, both of 58 Rue Frederic Pelletier, Brussels, Belgium
Filed Apr. 11, 1960, Ser. No. 21,567
12 Claims. (Cl. 40—28)

This invention relates to a device for the production of pictures and other visual displays on a screen of any size whatever that is plane, curved or of any compound shape whatsoever, suitable both for the production of fixed pictures and for that of moving or animated pictures. It also concerns the production of pictures both in black and white and in color, and can be used for the most diverse purposes, such as, for example, advertising, decorative panels, signs, mass instruction, cinema, formations of texts and numerical tables, etc., both during daylight and at night.

The essential feature of the invention is a screen which has a special structure. The screen is made up of a large number of small parts. The picture is conceived as a cybernetic whole, as a constellation of units of a different degree of grey, or shade of color. All the changes occur exclusively in elementary cells.

The cells, or elementary surfaces, can each be varied individually in their colors or degree of grey. For this purpose, each cell may have a variable proportion of black and white to provide a spectrum of shades of grey, or may have variable proportions of two or more other colors, for example of four primary colors, to vary the apparent color and shade. A similar effect may be produced by providing each cell with a color-spectrum or shade-spectrum surface and moving such surface to present different color or shade values at the face of the screen. The invention makes provision for the means of causing the cells to vary independently of one another. The entirety of these variations of value gives a new constellation, a new picture.

The production, obliteration or changing of a picture may be done electronically or electromechanically. There is a correlation between the color values of the various elemental areas or cells of the screen. (By color values we mean to refer both to different colors as such and to different shades of the same color, for example, different shades of grey.) The number of cells is generally large and depends on aesthetic and rational factors, these requiring a certain grain size. The proportion between the dimensions of the screen and the number of cells is determined by the minimum distance between the screen and the spectators provided for. There are other special points of view which affect the choice of the size and the construction of the cells for each particular case. As a simple example, several tens of thousands of cells per square metre of screen can be provided for. In the case of large screens viewed from a relatively large distance, the density of the points can of course be lowered.

The invention provides that the cells can be furnished with moving curtains of the same color or of different colors, these curtains being provided with means of control for moving them individually or in groups, so as to make these curtains visible on the desired part of the diverse cells. According to the invention, the curtains can be made to move by any suitable means whatsoever, for example by manual, mechanical or electrical means. These moves can be produced in accordance with a program drawn up for forming a picture, or these moves can be controlled by means of reading an existing picture which must be reproduced on the screen, or by means of a magnetic or perforated tape or other record.

A screen can have a host of openings, each of which can be masked by a diaphragm, which act as curtains and which can cause to appear a part of variable size of the surface of a screen located behind the diaphragms. The degree of closing determines the color value of the cell, for example, the proportion of black and white in the cell.

The invention contemplates various forms of execution of the screen, the main constructional parts of which, that is to say the cells, are equipped with movable curtains in order to cover and uncover the desired part of the elementary cell surface.

The accompanying drawings illustrate the invention. In such drawings:

FIG. 1 represents a screen in accordance with the invention, comprised of an array of closely spaced or contiguous cells, represented by a hexagonal pattern of circles, each of variable color value, and displaying a simple picture which when observed from a distance (of say 10 to 20 meters on the scale shown) will appear to be an isometric view of a cylindrical body;

FIG. 2 is an enlarged view of an individual element or cell of FIG. 1, having a curtain in the form of two half-flights of a helix;

FIG. 3 is an isometric view of the curtain used in FIG. 2, mounted on a shaft driven by a suitable motor or control device;

FIG. 4 is a view similar to FIG. 2, showing a modification having a curtain in the form of a single complete flight of a helix;

FIG. 5 is an isometric view of the curtain and control device of FIG. 4;

FIG. 6 is a vertical section of a modification for producing a color picture or similar display, taken on the line 6—6 of FIG. 7;

FIG. 7 is a fragmental front elevation of the screen of FIG. 6, with the four curtains of one cell rotated to partially exposed positions;

FIG. 8 is a front elevation showing a modified cell in the form of an iris diaphragm, as used in photography, in which the center or background is of one color, say white, and the iris blades are of another color, say black;

FIG. 9 shows a modification in the form of a cylinder having different shades or colors on its surface and rotatable to present such shades or colors at the face of the screen; and FIG. 10 shows a similar modification in which a shade or color spectrum is carried by a belt extending around a pair of rollers.

The embodiment depicted in FIG. 1 comprises a screen or background surface 10 of white color over which are located a multiplicity of elementary cells 12 represented by the circles shown. The several cells may take any of several forms. In the form shown in FIGS. 2 and 3, each cell includes a two-bladed curtain of black color with the curtain blades 14 and 16 mounted on a shaft 18 in position to be extended through two radial slots 20 in the background surface 10 of the screen to expose more or less of their black surfaces at the face of the screen. By suitably varying the positions of the curtains of the several cells, as by actuating the control motors 22 of the curtains, a picture or other visual display can be made to appear on the face of the screen.

A similar result can be produced with an array of elements composed of two discs of contrasting colors, say black and white. One of the discs is fixed, and corresponds to the circular portion defined by the dotted line in FIGS. 2 or 4, and the other disc is rotatable relative thereto, as is the disc 16 of FIG. 2 or the disc 24 of FIG. 4. Two vertical discs are parallel to the plane of the screen, and both are on the same axis. Each disc is provided with one (or more) radial slots enabling the fixed disc to be covered by the rotatable disc progressively. Let us assume that the disc is white and the other disc black, the two extreme values of the cell will therefore be all black and all white. Between these two extremes, the total surface of the cell is shared by the discs in any varying proportion, visually corresponding to a whole scale of greys. The discontinuity of the image thus produced is eliminated by simple calculations, which follow well known correlations between distance from the spectator and size of the cell (density of the spots).

The modification of FIGS. 4 and 5 is similar to that of FIGS. 2 and 3, except that it uses a single-bladed curtain 24 mounted on a shaft 28, controlled by a motor 32 and extendable through a single radial slot 30 in the screen 10.

The alterations of the cells or spots: We obtain the alteration in the color value of a point or element of the picture by the rotation of the curtains of the cells around their axes. The points can be altered singly or in groups as in a vertical sweep. Each point is made up of a cell activated individually (by for example electromotive means) and controlled (for instance by an electronic device). The control system is always dependent on each requirement, as is also the speed, which can vary from very slow to very fast. The reading of an image to be reproduced, the storing and recording of it, and the electronic control of the cells, may be done by systems already in use industrially. The rotating discs appear in the slots of the screen, in order to cover its surface wholly or partly, as shown in FIG. 1. In this way, all the possible values of a point between black and white are potentially there already on the elementary cell. The quality of the picture obtained will depend on the size and number of elements used.

The position and the rotation of the moving discs are controlled by any kind of mechanism in accordance with a prior programme. This programme, theoretically, can be created directly, which would mean the purely cybernetic method of producing pictures, but in practice we are speaking of the reproduction of existing pictures (photos, texts, etc.), that is to say of their translation or transmission onto this cybernetic screen.

The modification shown in FIG. 6 comprises a screen 40 in the form of a series of horizontal strips which are successively offset to leave a series of downwardly open narrow slots 60 between them, and behind which sets of color curtains are mounted at closely spaced points. Each set comprises a plurality of semicircular curtains of different colors, for example, a black curtain 42, a red curtain 44, a yellow curtain 46, and a blue curtain 48. The several curtains are carried by coaxial shafts 50 whose positions of rotation are controlled by separate electromotive devices 62, 64, 66, and 68. Each set of curtains is positioned for projection through a common slot 60 in the screen 40, to produce greater or smaller areas of color or mixtures of color at the face of the screen. As is indicated in FIG. 7, the several sets of color curtains are preferably arranged in a close array over the area of the screen.

FIG. 8 shows a modified cell construction in the form of an iris diaphragm assembly, such as is used in photography, mounted in front of a background. The background 80 is of one color, say white, and the iris blades 82 are of another color, say black. By operating the iris assembly to enlarger the central opening of the diaphragm more of the white background will be exposed and less of the black blades will show, and vice versa, so that the operation will vary the relative amounts of black and white which appear at the front of the iris type cell.

FIG. 9 shows a form of cell in which a cylinder 90 is rotatable in a window 92 in a screen 94, and carries on its surface a pattern of different colors or shades. In an array of such cells, selective rotation of the several cylinders will vary the color value or effect which the cells display at the front of the screen.

FIG. 10 shows a form of cell in which a belt 100 is carried by a pair of rollers 102, one of which is mounted in a window 104 of a screen 106. The belt carries a shade or color spectrum, and rotation of the rollers will carry differently colored portions of the belt to exposed position in the window, to change the color value which the cell presents for observation.

The production of pictures (or like displays) on the screen may be done by "reading" an existing or prepared "copy" to obtain a series of electrical signals or impulses corresponding to the color values—grey values with black and white reproductions—of the several points on the copy. These impulses are used to bring the cells into operation through a control mechanism practically simultaneously, or else in accordance with a time sequence. The means of reading may be more or less complicated. The same means of reading can scan or explore successively several or even all the elementary zones of the picture to be reproduced, or else a means of reading can be provided for each of these zones.

Each means of reading can control instantaneously the curtain or curtains of the elementary cell of the screen, corresponding to the explored elementary zone of the picture to be reproduced, so as to reproduce a corresponding shade of color in the cell. Or else the reading made for each elementary zone can be recorded, for example by transforming it into a numerical value which is recorded for example on a perforated card, tape, or on a magnetic tape, which permits the subsequent reproduction of the picture through means of control which transform these numerical values into movements of amplitude corresponding to the curtains and thus into shades of color corresponding to the various cells of the screen.

A means of reading can for example be made up of a photoelectric cell. In the case of a colored picture, it is a color measuring instrument which translates the colorimetric variation into an electric potential variation, which controls the corresponding movement of the curtain or curtains of the corresponding cell.

The application of the basic principle of the invention has direct consequences for the production of polychrome pictures. Among these, similar to printing, is included the quadrichrome picture. The picture is made up of four basic colors. In this case, a unit of the microstructural screen may consist of four cells, each of which represents a basic color, or a four-curtain unit can be used, to make visible the necessary size of their colored surface, thereby to create a polychrome effect.

The emission of animated cartoons and of other moving pictures: The change in the value of the points, their translation into a change of electric signal and its translation into a rotating movement, the result of which is again a change in color or shade value of the corresponding cells, reproduces the moving picture on the screen. Our invention is basically different from the cinema or motion-picture system. The basic difference is that while the cinema projects in a rapid succession photos of static phases (taken stroboscopically from reality) and is therefore obliged to repeat the picture 24 times per second in order to obtain the illusion of motion, the cybernetic screen forming the subject of the invention is closer to reality by the fact that it changes only those points which also undergo a change in reality, the other parts of the picture remaining motionless.

The sensing observation or photography of moving scenes to be displayed may be done in a manner comparable with direct television photography.

The main fields of use: Since the choice of the screen described above is completely free as regards size, from individual receivers to giant screens (for example 30 x 40 meters), it is obvious that the field of use is very extensive.

Its other chief qualities, such as visibility in daylight, quality of the picture, etc., permit its application in various fields. In advertising, it enables fixed panels (1) to be periodically transformed (let us say weekly) either locally or by remote telecontrol, (2) permits the realization in daylight of the well-known news bulletin display, and (3) makes possible the emission of animated posters of very large size that can be seen miles away.

In decoration or architecture, the invention permits decorative kinetic panels.

In signalling technique, it permits emission of visual signals (static, changing, or continuously moving) visible in daylight, for ports, airfields, road traffic, sport grounds, etc.

For instruction, it permits production of static or moving figurations, diagrams and the like.

We claim as our invention:

1. Visual display apparatus, comprising
    an array of a large number of closely spaced display elements forming individual elemental parts of, and together constituting, a visual display screen,
    said elements being individually of such small size relative to the size of the screen that at normal viewing distance the same are substantially imperceptible as individual elements and are observed as merging parts of the overall screen,
    said elements each having means for presenting a display surface of predetermined color value for observation as an elemental part of the display screen,
    and each having means of a different color value movable to a range of positions for varying the color value presented by the element as its elemental part of the screen, and
    means for individually and selectively actuating said elements to select the color values which are respectively presented by the individual elements and thereby to create on the screen a desired display composed in its elemental parts of the selected color values obtained at the several elemental parts of the screen by said actuation of said elements.

2. Visual display apparatus, comprising
    an array of a large number of closely spaced elements respectively forming individual elemental parts of, and together constituting, a visual display screen,
    said elements being individually of such small size relative to the size of the screen that at normal viewing distance the same are substantially imperceptible as individual elements and are observed as merging parts of the overall screen,
    said elements each having a display surface of a selected color value normally presented for observation as an elemental part of the display screen
    and each having a movable curtain of a color value different from that of the normally-presented surface and movable over the normally-presented surface to cause the element to present as its elemental part of the screen a variable proportion of the color values of the normally-presented surface and the curtains, and
    means for moving the curtains of the several elements to individually selected positions to selectively determine the color values presented at the several elemental parts of the screen and thereby to create on the screen a selected design composed in its elemental parts of the selected color values presented at the several elemental parts of the screen by the said elements.

3. Visual display apparatus as defined in claim 2 in which the two color values are black and white, whereby changes in the proportion therebetween produces an effect of different shades of grey.

4. Visual display apparatus as defined in claim 2 in which the display elements comprise variably-exposed surfaces of primary colors whereby changes in exposure areas of such surfaces produces an effect of different color mixtures.

5. Visual display apparatus as defined in claim 2 in which the normally-presented display surfaces of the several elements constitutes a substantially continuous screen surface, and the curtains are movable through slots therein to overlie variable portions of said screen surface.

6. Visual display apparatus as defined in claim 5, comprising elements in which the curtain is in the form of a helix mounted on a shaft and movable through a radial slot, and said shaft is rotatable to extend a variable portion of the helical curtain to exposed position.

7. Visual display apparatus as defined in claim 5, comprising elements having a plurality of radial blades mounted for rotation through radial slots.

8. Visual display apparatus comprising
    an array of a large number of closely spaced display elements forming individual elementary parts of, and together constituting, a visual display screen,
    said elements being individually of such small size relative to the size of the screen that at normal viewing distance the elements are relatively imperceptible as individual elements and are observed as merging parts of the overall screen,
    said elements each comprising a movable device having a surface which bears at least one predetermined color value and which is exposable for observation to determine the color value presented by the element as its elemental part of the screen,
    and each having means of a different predetermined color value for masking at least a portion of such surface while exposing another portion,
    means for individually actuating the several devices to individually selected positions to individually select the color values presented by the respective elements for observation as elemental parts of the screen and thereby to create on the screen any desired design composed in its elemental parts of the color values obtainable by such actuation of the several display elements constituting the display screen.

9. Visual display apparatus as defined in claim 8 in which the movable device is a radial wall rotatable about an axis.

10. Visual display apparatus as defined in claim 8 in which the movable device is a cylinder and the color surface is the cylindrical surface thereof.

11. Visual display apparatus as defined in claim 8 in which the color surface is the surface of a belt-like element movable past a window in the masking means.

12. Visual display apparatus comprising
    an array of a large number of closely spaced display elements forming individual elemental parts of, and together comprising, a visual display screen,
    said elements being individually of such small size relative to the size of the screen that at normal viewing distance the same are substantially imperceptible as individual elements and are observed as merging parts of the overall screen,
    said display elements each comprising a surface bearing at least one predetermined color value,
    each having means of a different predetermined color value for masking at least a portion of such surface and exposing another portion for observation as part of the screen, said surface and said masking means of each display element constituting a pair of components, one of said components being movable relative to the other, each said display element having means for moving its said movable component to vary the portion of said surface exposed for observation, said elements being individually and selectively operable to a range of positions of surface exposure to create on the screen any desired design composed in its elemental parts of color values produced at the several elements by such selective individual operation.

References Cited in the file of this patent

UNITED STATES PATENTS

| | | |
|---|---|---|
| 1,451,810 | Bower | Aug. 17, 1923 |
| 2,245,110 | Marcaccio | June 10, 1941 |
| 2,495,054 | Cooper | June 17, 1950 |
| 2,527,803 | Fleak | Oct. 31, 1950 |
| 2,606,373 | Lamberger | Aug. 12, 1952 |
| 2,618,078 | Weil | Nov. 18, 1952 |
| 2,658,187 | Haskin | Nov. 3, 1953 |
| 2,833,176 | Ossoinak | May 6, 1958 |
| 2,924,895 | Bachi | Feb. 16, 1960 |
| 3,021,614 | Rubin | Feb. 20, 1962 |